Sept. 30, 1969      L. E. DUNLAP      3,469,611
TOOL GUIDE AND MOVABLE SUPPORT
Filed Feb. 13, 1967
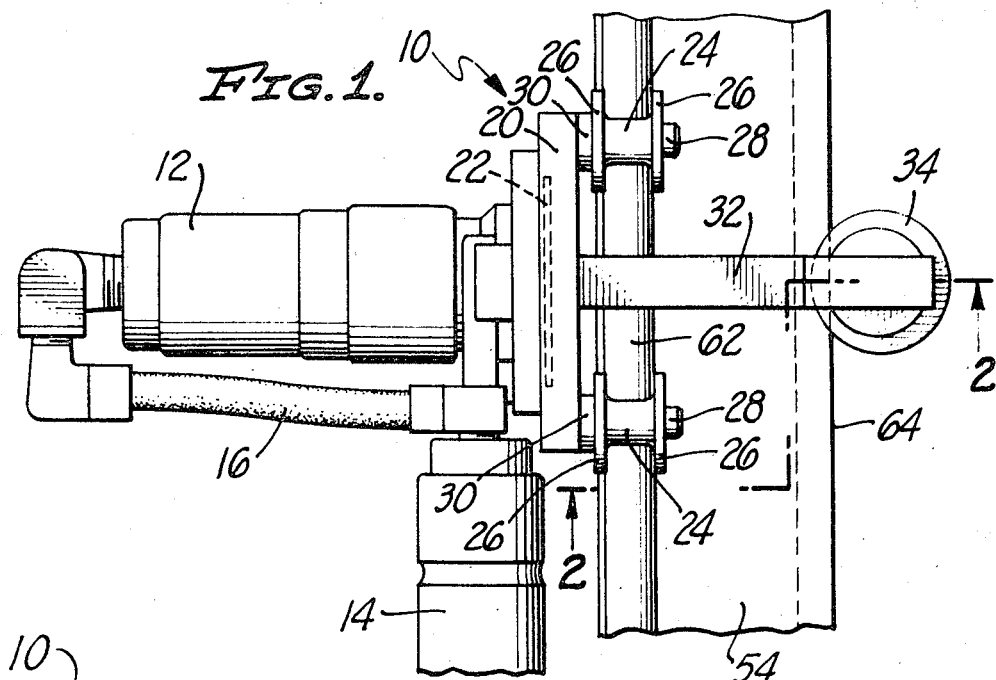
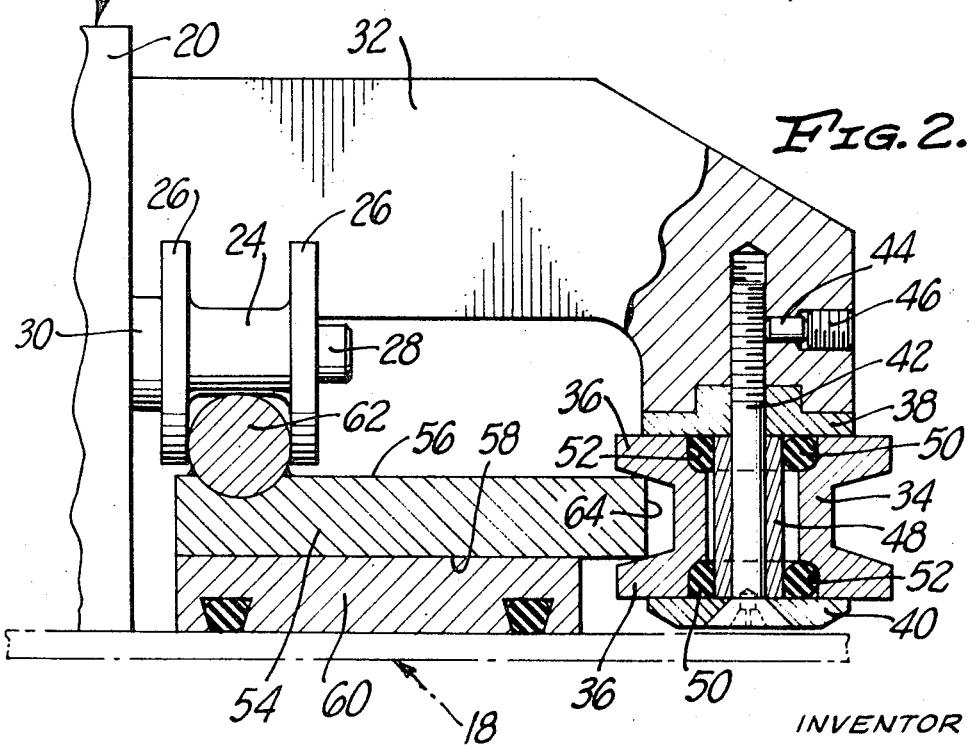
INVENTOR
LAUREL E. DUNLAP
BY
MAHONEY & HORNBAKER
ATTORNEYS

United States Patent Office 3,469,611
Patented Sept. 30, 1969

3,469,611
TOOL GUIDE AND MOVABLE SUPPORT
Laurel E. Dunlap, 4510 Mary Ellen Ave.,
Sherman Oaks, Calif. 91403
Filed Feb. 13, 1967, Ser. No. 615,446
Int. Cl. B27c 5/00, 9/00
U.S. Cl. 144—144                    5 Claims

ABSTRACT OF THE DISCLOSURE

A guide and support having transversely spaced guide rollers supporting a tool movable along a longitudinally extending path of working operation, said guide rollers being retained through resilient transverse tensioning therebetween engaged with parallel guide tracks guiding said tool movement.

CROSS-REFERENCES TO RELATED APPLICATIONS

This application illustrates, describes and claims subject matter shown and described, but not claimed, in my copending application, Ser. No. 588,547, filed Oct. 21, 1966, entitled "Tool Guide Support and Sawguard."

BACKGROUND OF THE INVENTION

This invention relates to a tool guide and movable support of the type wherein a tool is supported by spaced and parallel guide tracks movable along a predetermined path of working operation. More particularly, this invention relates to a tool guide and movable support of the foregoing type wherein support means for the tool movably supporting said tool on the guide tracks are maintained engaged with said guide tracks through resilient tensioning between said guide means permitting said support means to support said tool in outrigger fashion wherein said guide tracks may be spaced at one side of said path of working operation.

Various prior forms of tool guide supports have been proposed for mounting tools, such as power tools, movable along a particular predetermined path of working operation for performing various working functions on workpieces. The various required functions of these tool guide supports is that the tool must be guided in a predetermined path and at the same time, means must be provided for properly supporting the tool, which means must either be positioned on the workpiece surface or closely adjacent thereto.

One of the major difficulties with the prior proposed constructions is that, in order to provide the function of properly supporting the tool relative to the workpiece, these prior constructions have necessarily included various supporting members which extend to both sides of the line of working operation around which the tool must move. This results in the actual working area and the tool during the working operation being hidden from view and it is many times impossible to determine if the work is being properly performed by the tool.

SUMMARY OF THE INVENTION

In general terms, the tool guide support of the present invention for mounting a tool movable along a predetermined longitudinal path over a workpiece surface and conforming to a predetermined path of working operation perferably includes the combination of a tool such as a rotary saw having means such as a sawblade thereon for performing a working operation movably supported on first and second longitudinally extending guide tracks which are transversely spaced and parallel. The guide tracks are preferably mounted on a plate exposed for engagement in planes spaced between substantially 90° and 180° to each other and spaced from and parallel to the predetermined path of working operation, both said tracks preferably being transversely spaced from one side of the predetermined path of working operation.

The tool is movably supported on said guide tracks through guide means, preferably in the form of peripherally grooved guide rollers, and there is resilient means between said support means compressed when said support means are engaged with said guide tracks for maintaining a transverse tension between said support means to resiliently maintain said support means engaged with said guide tracks.

It is, therefore, an object of my invention to provide a tool guide and movable support particularly adaptable to power tools which supports the tool guided movable along a predetermined path of working operation along a workpiece surface in which virtually the entire supporting structure for the tool may be positioned at one side of such path of working operation so that the opposite side remains completely exposed and it is easy for a workman to properly observe the work being performed.

Furthermore, the support means mounts the tool on guide tracks spaced apart and spaced from the path of working operation with said guide means being positively engaged with said guide tracks in order to maintain the tool properly supported. Still further, the guide means preferably spaced a maximum distance from said path of working operation is supported through resilient means for maintaining a tension between said support means to resiliently maintain said support means engaged with the guide tracks.

Other objects and advantages of the invention will be apparent from the following specification and the accompanying drawing which are for the purpose of illustration only.

BRIEF DESCRIPTION OF THE DRAWING

FIG. 1 is a fragmentary, top plan view of a tool incorporating the guide and movable support of the present invention; and FIG. 2 is an enlarged, fragmentary sectional view taken along the broken line 2—2 in FIG. 1.

DESCRIPTION OF THE BEST EMBODIMENT CONTEMPLATED

Referring to the drawing, a tool guide and support incorporating the principles of the present invention is illustrated and includes a tool in the form of a power saw, generally indicated at 10, having secured thereto a driving air motor 12 and a control handle 14, the air supply for the air motor entering the rear portion of the control handle, not shown, flowing from said control handle through a supply tube 16 into and driving said air motor. For purposes of the present invention, the power saw 10 is generally of usual construction for performing a working or cutting operation on a workpiece, in the present instance, a flat plate generally indicated at 18 and shown in phantom lines in FIG. 2. The power saw 10 also includes a saw blade guard 20 encompassing a rotatable saw blade 22.

More particularly to the principles of the present invention, the saw blade guard 20 rotatably supports a pair of longitudinally aligned and spaced first guide rollers 24, said first guide rollers being peripherally grooved so as to have transversely spaced flanges 26 and being rotatably mounted on the saw blade guard through shafts 28 and spacers 30. Also, an outrigger arm 32 is secured to the saw blade guard 20 longitudinally intermediate the first guide rollers 24 and extends transversely spaced beyond the first guide rollers.

The outrigger arm 32 extends transversely outwardly and then downwardly, and rotatably mounts a second guide roller 34 at the lower extremity thereof, but with the second guide roller axis of rotation extending in a plane 90° to the plane of the first guide roller axes of rotation.

The second guide roller 34, similar to the first guide rollers 24, is peripherally grooved so as to have axially spaced side flanges 36. Furthermore, the second guide roller 34 is rotatably mounted on the extremity of the outrigger arm 32 between upper and lower bearing plates 38 and 40 through a center shaft 42 threadably received within the outrigger arm and retained against rotation by a retaining pin 44 and set screw 46. The threaded mounting of the center shaft 42, therefore, retains the bearing plates axially against the second guide roller 34 to eliminate any axial "play" as shown in FIG. 2, while still permitting relative rotation. A hub 48 is telescoped over the center shaft 42 for rotation relative to said shaft and the second guide roller 34 is telescoped over the hub maintained radially spaced from said hub by a pair of resilient material O-rings 50.

The O-rings 50 are partially radially outwardly received in appropriate internal annular grooves 52 of the second guide roller 34 and bear against the outer circumference of the hub 48, said O-rings preferably being located, respectively, axially adjacent the upper and lower bearing plates 38 and 40. Thus, although the second guide roller 34 is rotatably mounted on the outrigger arm 32, the O-rings 50 provide a resilient mounting between the second guide roller and the outrigger arm re-active for creating a resilient transverse tensile force between said second guide roller and the first guide rollers 24, the purpose of which will be hereinafter discussed more in detail. Also, the first guide rollers 24 are peripherally exposed for downward engagement and the second guide roller 34 is peripherally exposed for sideways engagement in a plane substantially 90° to the plane of exposure of said first guide rollers, and from the broad standpoint it is obvious that the resilient transverse tensioning between said first and second guide rollers may be created as long as said first and second guide rollers are exposed for engagement in planes substantially 90° to 180° to each other.

A support plate 54 preferably having flat upper and lower surfaces 56 and 58 is mounted with the lower surface thereof secured to a vacuum plate 60, said vacuum plate being of usual construction and retained by vacuum on the workpiece plate 18 in the usual manner. A cylindrical first guide track 62 is secured partially recessed within the support plate upper surface 56 and extending longitudinally parallel to the path of working operation of the rotatable saw blade 22 on the workpiece plate 18, but transversely spaced to one side of said path of working operation.

A second guide track 64 is formed by an exposed side edge created by an overhang of the support plate 54 transversely from the vacuum plate 60, said second guide track or support plate exposed side edge 64 being transversely spaced a greater distance from the path of working operation than the first guide track 62 and being parallel to said path of working operation, as well as the first guide track.

Thus, by first engaging the second guide roller 34 with the second guide track 64 and then engaging the first guide rollers 24 downwardly over the first guide track 62, the entire power saw 10 may be longitudinally movably supported by the various guide rollers so as to support the rotatable saw blade 22 movable longitudinally exactly along the path of working operation on the workpiece plate 18. Furthermore, the transverse distances between the first and second guide rollers 24 and 34, and between the first and second guide tracks 62 and 64, is such that the engagement of the guide rollers with the respective guide tracks will compress the second guide roller resilient O-rings 50. Such will thereby create a resilient tensile force between the first and second guide rollers 24 and 34 so as to positively resiliently retain said guide rollers engaged with the first and second guide tracks 62 and 64.

In this manner, accidental displacement of the power saw 10 from its guide along the path of working operation is prevented. At the same time, the resilient tensioning between the first and second guide rollers 24 and 34 is such so as to permit easy disengagement between said guide rollers and the first and second guide tracks 62 and 64 when such displacement is desired. Said resilient tensioning between the first and second guide rollers 24 and 34 is particularly beneficial in the case of the outrigger support of the power saw 10, as illustrated, and permits the previously discussed positive retainment of the power saw 10 on the support plate 54 while still permitting the entire movable support for said power saw to be at one side transversely spaced from the path of working operation of the rotatable saw blade 22.

I claim:

1. In a guide support for mounting a tool movable along a predetermined longitudinal path over a workpiece surface and conforming to a predetermined path of working operation, the combination of: a tool having means thereon for performing a working operation; first and second longitudinally extending guide tracks, said guide tracks being transversely spaced and parallel; means mounting said guide tracks exposed for engagement in planes spaced substantially 90° to each other and spaced from and parallel to a predetermined path or working operation, said first guide track projecting upwardly and said second guide track projecting transversely from and parallel to a predetermined path of working operation; transversely spaced first and second grooved guide roller means rotatably connected to said tool and longitudinally movably engaged, respectively, downwardly over and transversely over said first and second guide tracks for mounting said tool longitudinally movable along said guide tracks and along said path of working operation; said first grooved guide roller means being rigidly connected to said tool except for said rotation relative to said tool and being generally transversely engaged with said first guide track at a track side away from said second grooved guide roller means; resilient material means between said second grooved guide roller means and a shaft mounting said second guide roller means on said tool, said second guide roller means being rotatable relative to said shaft, said resilient material means being compressed when said first and second guide roller means are engaged with said guide tracks for maintaining a transverse tension between said guide roller means to resiliently maintain said guide roller means engaged with said guide tracks; and bearing plates on said second guide roller means shaft axially slidably engaging said second guide roller means with said second guide roller means axially therebetween permitting said second guide roller means rotation and said resilient material means compression while rigidly axially confining said second guide roller means.

2. A guide support as defined in claim 1, in which transversely extending support arm means operably connects said second guide roller means to said tool and maintains said first and second guide roller means transversely spaced apart, saaid tool extending transversely from said first guide roller means oppositely from said support arm means of said second guide roller means so that said first and second guide roller means support said tool in cantilever fashion; and in which said shaft for said second guide roller means is secured between said second guide roller means and said support arm means.

3. A guide support as defined in claim 1, in which a transversely extending support arm is secured to said tool and rotatably supports said second guide roller means through securement with said shaft transversely spaced from said first guide roller means; in which a hub is rotatably mounted on said shaft telescoped by said second guide roller means between said bearing plates; and in which said resilient material means includes at least one annular resilient member positioned radially between said hub and said second guide roller means compressed when said guide roller means are engaged with said guide tracks.

4. A guide support as defined in claim 1, in which a hub is rotatably connected to said shaft and telescoped by said second guide roller means between said bearing plates; and in which said resilient material means includes at least two annular resilient members positioned transversely spaced radially between said hub and said second guide roller means compressed when said guide roller means are engaged with said guide tracks.

5. A guide support as defined in claim 1, in which said means mounting said guide tracks includes a mounting plate having an upper surface and a side edge, said plate being transversely spaced from said predetermined path of working operation, said plate upper surface extending transversely, said plate side edge extending longitudinally parallel to said predetermined path or working operation, said first guide track extending upwardly from said plate upper surface transversely spaced from said predetermined path of working operation, said second guide track including surfaces at said plate side edge, said plate side edge being transversely spaced from said predetermined path of working operation a greater distance than said first guide track; in which said first guide roller means includes longitudinally spaced peripherally grooved rollers, said first guide roller means rollers being rotatably connected to said tool and peripherally engaged downwardly over said first guide track, said second guide roller means including a peripherally grooved roller peripherally engaged over said plate side edge and having an axis of rotation extending at substantially 90° to axes of rotation of said first guide roller means rollers; in which a rigid support arm is secured to said tool and extends transversely to said shaft of said second guide roller means roller with said shaft secured thereto; in which a hub is rotatably mounted on said shaft between said bearing plates telescoped by said second guide roller means roller and radially spaced from said second guide roller means roller; and in which said resilient material means includes axially spaced annular resilient members between said hub and said second guide roller means roller compressed when said guide roller means rollers are engaged with said guide tracks.

References Cited

UNITED STATES PATENTS

| | | | |
|---|---|---|---|
| 936,250 | 10/1909 | McDonough | 144—246.1 |
| 1,638,122 | 8/1927 | Jull | 143—47.4 |
| 1,926,828 | 9/1933 | Van Berkel. | |
| 1,846,641 | 2/1932 | Hedgpeth. | |

FOREIGN PATENTS 533,287   9/1931   Germany.

ANDREW R. JUHASZ, Primary Examiner

JAMES F. COAN, Assistant Examiner

U.S. Cl. X.R.

143—43, 160; 308—3, 6